(12) United States Patent
Aoki et al.

(10) Patent No.: US 11,886,927 B2
(45) Date of Patent: Jan. 30, 2024

(54) ICT RESOURCE MANAGEMENT DEVICE, ICT RESOURCE MANAGEMENT METHOD AND ICT RESOURCE MANAGEMENT PROGRAM

(71) Applicant: Nippon Telegraph and Telephone Corporation, Tokyo (JP)

(72) Inventors: Daisuke Aoki, Tokyo (JP); Takeshi Kuwagata, Tokyo (JP); Katsuyuki Hasebe, Tokyo (JP); Makoto Kanzaki, Tokyo (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 439 days.

(21) Appl. No.: 17/299,652

(22) PCT Filed: Nov. 25, 2019

(86) PCT No.: PCT/JP2019/045934
§ 371 (c)(1),
(2) Date: Jun. 3, 2021

(87) PCT Pub. No.: WO2020/116223
PCT Pub. Date: Jun. 11, 2020

(65) Prior Publication Data
US 2022/0035681 A1  Feb. 3, 2022

(30) Foreign Application Priority Data
Dec. 4, 2018  (JP) .................................. 2018-227540

(51) Int. Cl.
*G06F 9/455* (2018.01)
*G06F 9/50* (2006.01)
*G06F 9/54* (2006.01)

(52) U.S. Cl.
CPC ........ *G06F 9/5077* (2013.01); *G06F 9/45558* (2013.01); *G06F 9/5072* (2013.01);
(Continued)

(58) Field of Classification Search
None
See application file for complete search history.

(56) References Cited

U.S. PATENT DOCUMENTS

2013/0232498 A1  9/2013  Mangtani et al.
2015/0082308 A1  3/2015  Kiess et al.
(Continued)

FOREIGN PATENT DOCUMENTS

JP  2015-056182  3/2015
JP  2018-032897  3/2018

*Primary Examiner* — Craig C Dorais
(74) *Attorney, Agent, or Firm* — Fish & Richardson P.C.

(57) ABSTRACT

An ICT resource management device that manages a physical node and a virtual node as ICT resources includes: a configuration information management part configured to manage configuration information; a cloud infrastructure selection part configured to select a cloud infrastructure in response to a request for a configuration change concerning a connection of a device that uses a cloud service to a physical node; a layer mapping part configured to perform a mapping between the physical layer and the virtual layer; a blueprint creation part configured to create, in response to the request for a configuration change, a blueprint based on the configuration information, the selected cloud infrastructure, and mapping information, wherein the blueprint is design information of an infrastructure that is required for the configuration change; and an orchestrator part configured to perform orchestration based on the blueprint.

6 Claims, 6 Drawing Sheets

(52) U.S. Cl.
CPC ...... *G06F 9/547* (2013.01); *G06F 2009/4557* (2013.01); *G06F 2009/45595* (2013.01)

(56) References Cited

U.S. PATENT DOCUMENTS

| | | | |
|---|---|---|---|
| 2018/0322556 A1 | 11/2018 | Padmanabh et al. | |
| 2019/0146816 A1* | 5/2019 | Reno | G06F 21/12 718/1 |
| 2021/0149742 A1* | 5/2021 | Turanyi | H04L 67/51 |

\* cited by examiner

| | Node ID | State | Host name | IP address | VM ID | Service used | User | Cloud infrastructure ID |
|---|---|---|---|---|---|---|---|---|
| Physical | PH1 | OK | host A | XXX | VI-1,VI-2 | ser1 | user1 | yyy |
| | PH2 | OK | host B | XXX | VI-3 | ser2 | user2 | zzz |
| | ... | ... | ... | ... | ... | ... | ... | ... |

| | Node ID | State | VM name | IP address | Physical device ID |
|---|---|---|---|---|---|
| Virtual | VI-1 | OK | VM1 | XXX | PH1 |
| | VI-2 | OK | VM2 | XXX | PH1 |
| | VI-3 | OK | VM3 | XXX | PH2 |
| | ... | ... | ... | ... | ... |

FIG. 5

Blueprint (24)

Service template:
- Catalog (for VM creation)
- Catalog (for NW configuration)
- Catalog (for container configuration)

Parameter:
- 5VMs, Web: 3VMs, AP: 2VMs
- allocated IP address
- Copy execution by Rancher

FIG. 6

| Service ID | Cloud infrastructure ID | Type | Used application | Charge | Quality | Providing area | Connected service ID | Operational ICT resource |
|---|---|---|---|---|---|---|---|---|
| XXX | XXX | XXX | XXX | XXX | XXX | XXX | XXX | XXX |
| ... | ... | ... | ... | ... | ... | ... | ... | ... |

ICT RESOURCE MANAGEMENT DEVICE, ICT RESOURCE MANAGEMENT METHOD AND ICT RESOURCE MANAGEMENT PROGRAM

CROSS-REFERENCE STATEMENT

The present application is a National Stage Application filed under 35 U.S.C. § 371, of International Patent Application No. PCT/JP2019/045934, filed on Nov. 25, 2019, and which application is incorporated herein by reference. To the extent appropriate, a claim of priority is made to the above disclosed application. The present application is further based on, and claims priority from, Japan Application Serial Number 2018-227540, filed on Dec. 4, 2018, the disclosure of which is hereby incorporated by reference herein in its entirety.

TECHNICAL FIELD

The disclosure relates to an ICT (Information and Communication Technology) resource management device, ICT resource management method, and ICT resource management program.

BACKGROUND ART

Development of techniques for a service provider to provide a service to an end user has been on the rise in the recent years. For example, Patent Literature 1 discloses "an inter-business-operator packaged service construction device that provides, in response to an order request for communication service use from a terminal of a service provider, a package of one or more communication services that are different from one another and made available through communication service APIs by wholesale service providers. The device includes a package construction function unit that (a) retains a catalog describing specifications of wholesale communication services and coordination rules defining coordination among various communication services, (b) constructs, in response to an order request for use of a plurality of communication services from the terminal, a coordinated service by coordinating the communication service APIs corresponding to the plurality of communication services requested by the order based on the retained catalog and coordination rules, and (c) provides the coordinated service to the terminal."

CITATION LIST

Patent Literature

Patent Literature 1: Japanese Unexamined Patent Application Publication No. 2018-32897 (claim 1)

SUMMARY

According to a first aspect of the disclosure, an ICT resource management device for managing a physical node and a virtual node as ICT resources includes: a configuration information management part configured to manage physical layer configuration information and virtual layer configuration information, wherein the physical layer configuration information is information on a configuration of the physical node in a physical layer and the virtual layer configuration information is information on a configuration of the virtual node in a virtual layer; a cloud infrastructure selection part configured to select, in response to a request for a configuration change concerning a connection of a device that uses a service to the physical node, a service infrastructure that meets a condition included in the request from a plurality of service infrastructures that realize the service; a layer mapping part configured to perform a mapping between the physical layer and the virtual layer; a blueprint creation part configured to create, in response to the request for a configuration change, a blueprint based on the physical layer configuration information, the virtual layer configuration information, the selected service infrastructure, and mapping information that results from the mapping, wherein the blueprint is design information of an infrastructure that is required for the configuration change; and an orchestrator part configured to perform, based on the blueprint, orchestration of the virtual layer by accessing and executing a program that is capable of being operated through an API.

According to a third aspect of the disclosure, an ICT resource management method of an ICT resource management device that manages a physical node and a virtual node as ICT resources is implemented by the ICT resource management device and includes: collecting physical layer configuration information and virtual layer configuration information, wherein the physical layer configuration information is information on a configuration of the physical node in a physical layer and the virtual layer configuration information is information on a configuration of the virtual node in a virtual layer; selecting, in response to a request for a configuration change concerning a connection of a device that uses a service to the physical node, a service infrastructure that meets a condition included in the request from a plurality of service infrastructures that realize the service; performing a mapping between the physical layer and the virtual layer; creating, in response to the request for a configuration change, a blueprint based on the physical layer configuration information, the virtual layer configuration information, the selected service infrastructure, and mapping information that results from the mapping, wherein the blueprint is design information of an infrastructure that is required for the configuration change; and performing, based on the blueprint, orchestration of the virtual layer by accessing and executing a program that is capable of being operated through an API.

BRIEF DESCRIPTION OF DRAWINGS

FIG. 3 is a data structure diagram showing an example of physical layer configuration information according to an embodiment.

FIG. 4 is a data structure diagram showing an example of virtual layer configuration information according to an embodiment.

FIG. 5 is a diagram for explaining an example of a blueprint according to an embodiment.

FIG. 6 is a data structure diagram showing an example of service management information according to an embodiment.

DESCRIPTION OF EMBODIMENTS

An embodiment according to the disclosure (hereinafter "this embodiment") is described with reference to drawings. In describing this embodiment, a "cloud service" may sometimes simply be referred to as a "service".

Configuration

Figure 1:
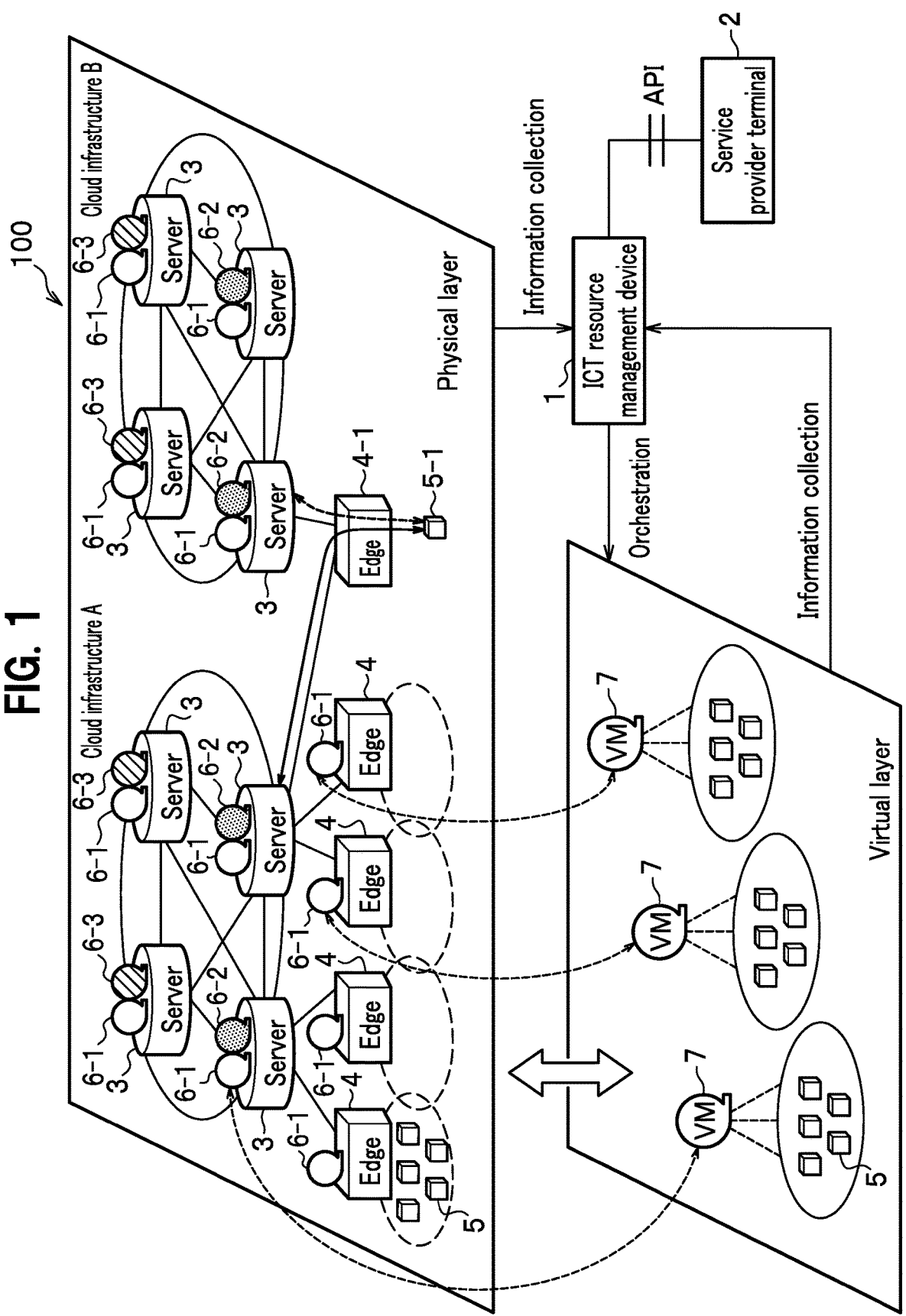
FIG. 1 is a functional configuration diagram showing an example of a distributed system including an ICT resource management device according to an embodiment.

As shown in FIG. 1, a distributed system 100 that includes an ICT resource management device 1 of this embodiment is a system in which virtualization technology is applied. The distributed system 100 includes an ICT resource management device 1, a service provider terminal 2, a server 3, edges 4 and 4-1, and devices 5 and 5-1. The edge 4-1 is one of multiple edges 4 that are present. The edges 4 and 4-1 may collectively be referred to as edges 4. The device 5-1 is one of multiple devices 5 that are present. The devices 5 and 5-1 may collectively be referred to as devices 5. The distributed system 100 is configured to manage a physical layer that is a collection of physical nodes and a virtual layer that is a collection of virtual nodes that operate by being configured over the physical nodes. The server 3, edges 4, devices 5 serve as physical nodes constituting the physical layer. Each virtual machine 7 (VM 7) that is disposed in the virtual layer as shown in FIG. 1 is a virtual node that is a virtualization of a server 3 or an edge 4.

In the physical layer, there exists multiple cloud infrastructures that realize various cloud services. FIG. 1 shows cloud infrastructures A and B as examples. Cloud infrastructures A and B (this may include cloud infrastructures now shown in the drawing) may each realize a service of the same type, for example a computing service. Even when the services realized by the cloud infrastructures A and B are of the same type and are therefore similar, the services are different in terms of one or more different conditions that are offered, such as charged price, quality, and/or providing area of service. In the virtual layer of FIG. 1, virtual nodes that correspond to the cloud infrastructure A are shown. Although omitted from FIG. 1 for convenience, virtual nodes corresponding to the cloud infrastructure B also exists in the virtual layer.

The ICT resource management device 1 manages a physical node and a virtual node as ICT resources.

The service provider terminal 2 is a terminal that requests a change in configuration such as initial deployment or scale variability. The service provider terminal 2 makes such a request through an API (application programming interface). The API is a northbound API between the ICT resource management device 1 and the service provider terminal 2. The service provider terminal 2 is used by a service provider.

The server 3 is a computer that performs a process related to service provision. A server 3 of FIG. 1 is, for example, arranged in the cloud infrastructure A or B and performs a process for a cloud service. A server 3 has therein at least one of one or more applications 6-1-6-3 for implementing a process related to service provision. Each of the applications 6-1-6-3 is used when providing a different service.

The edge 4 is a networking device that is installed in a network (NVV) and includes, for example, a router, bridge, and a gateway. An edge 4 has therein at least one of the one or more applications 6-1-6-3 for implementing a process related to service provision. The server 3 and the edge 4 are communicatively connected to each other.

The device 5 is equipment with which an end user uses a service. An example of device 5 is IoT (internet of things) equipment. The device 5 can use a service by connecting to an edge 4.

The ICT resource management device 1 collects information on a physical node and a virtual node. The ICT resource management device 1 performs a mapping between the physical layer and virtual layer by using the collected information (see double-headed broken arrow lines shown in FIG. 1).

The ICT resource management device 1 performs orchestration of the virtual layer. More specifically, the ICT resource management device 1 deploys a service and allocates a resource to a virtual machine 7 (VM 7).

Details of ICT Resource Management Device 1

Figure 2:
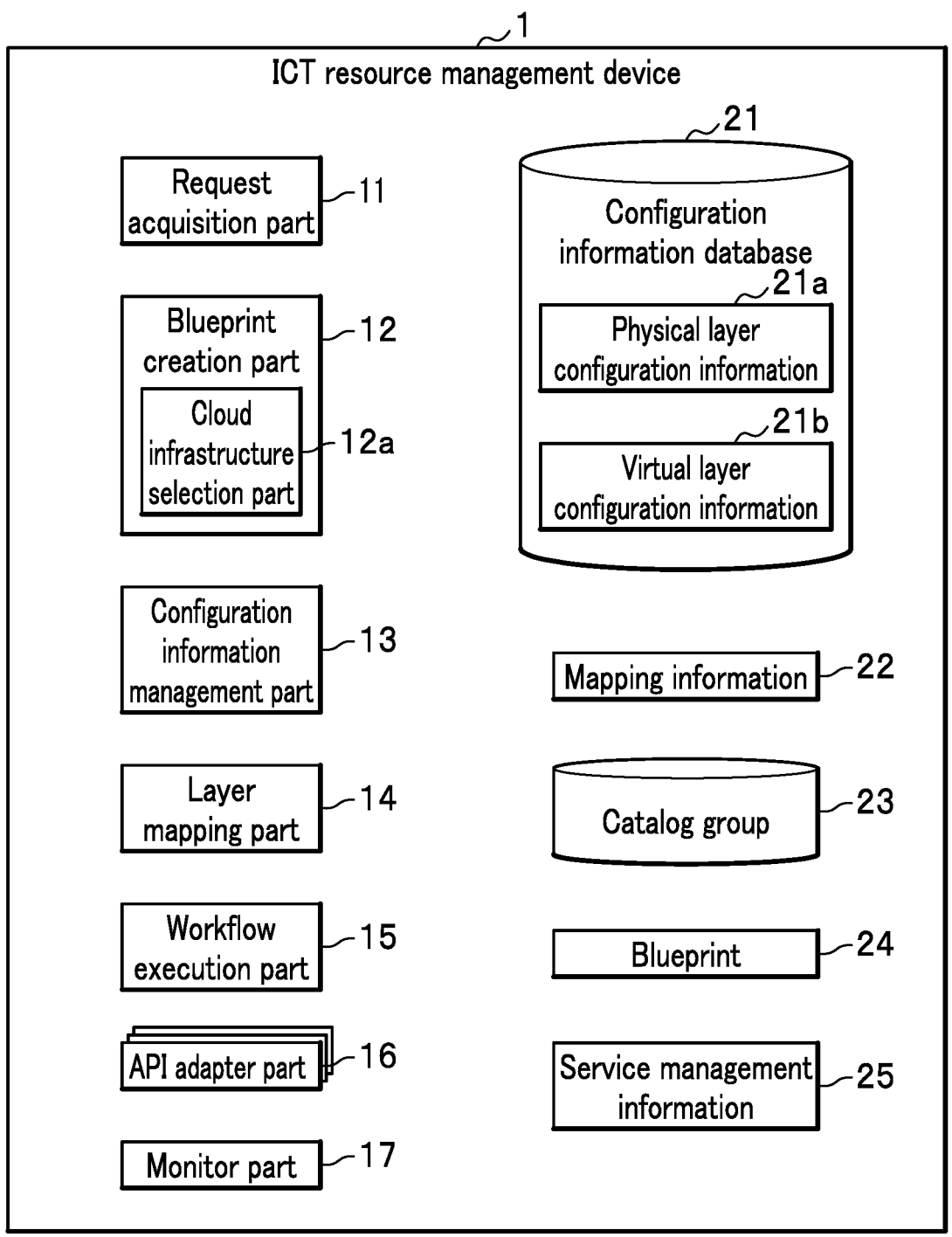
FIG. 2 is a functional configuration diagram showing an example of an ICT resource management device according to an embodiment.

As shown in FIG. 2, the ICT resource management device 1 includes functional parts such as a request acquisition part 11, a blueprint creation part 12, a configuration information management part 13, a layer mapping part 14, a workflow execution part 15, an API adapter part 16, and a monitor part 17. The blueprint creation part 12 includes a cloud infrastructure selection part 12a. The ICT resource management device 1 stores configuration information database 21, mapping information 22, catalog group 23, blueprint 24, and service management information 25 in a storage. The storage that the ICT resource management device 1 is equipped with may, for example, be disposed within the ICT resource management device 1 or in a device external to the ICT resource management device 1.

Request Acquisition Part 11

The request acquisition part 11 acquires a request to change a configuration from a service provider terminal 2. Such a request that is acquired by the request acquisition part 11 may also be referred to as "order information". Making a request for a configuration change is not limited to the service provider terminal 2. For example, a request for a configuration change may be made from a terminal of a person in charge of maintenance of the distributed system 100. Each of the service provider terminal 2 and the terminal of the maintenance person as described above may also be referred to as an externally provided device.

Blueprint Creation Part 12

The blueprint creation part 12 creates a blueprint 24 corresponding to order information that has been acquired by the request acquisition part 11. The blueprint 24 is design information of an infrastructure that is required for a requested configuration change. The infrastructure represents a component of an operating environment of a service and may refer to various components such as an ICT resource itself, set-up information of an ICT resource (e.g., a name of a virtual machine, an IP address, or a host name), a resource allocated to an ICT resource, a load balancer (LB) set up in a network (NW), a firewall (FW), and a container.

Configuration Information Management Part 13

The configuration information management part 13 manages information on an ICT resource as configuration information. The configuration information management part 13 collects information on a physical node and a virtual node by, for example, accessing an API for resource information collection. The API for resource information collection is an API for providing resource information that is prepared by each target of orchestration. The API for resource information collection is a southbound API between the ICT resource management device 1 and a target of orchestration. The collected information may for example be, but is not limited to, an MIB (management information base) according to SNMP (Simple Network Management Protocol). The configuration information managed by the configuration information management part 13 is stored in the configuration information database 21 and is categorized into physical layer configuration information 21a and virtual layer configuration information 21b.

A target of orchestration may be but is not limited to a physical node or a virtual node. An interface provided by the target of orchestration may, for example, be provided by a controller (not shown in drawings) that controls the target of orchestration or by each physical node or virtual node.

The physical layer configuration information 21a is configuration information on a physical node in the physical layer. As shown in FIG. 3, the physical layer configuration information 21a includes management items such as a "node ID", a "state", a "host name", an "IP address", a "VM ID", a "service used", a "user", and a "cloud infrastructure ID". Values of respective management items are stored for each physical node.

The "node ID" management item stores an identifier of a corresponding physical node.

The "state" management item stores an operation state of a corresponding physical node ("OK" for normal state of operation, "NG" for malfunctioning state of operation).

The "host name" management item stores a host name of a corresponding physical node.

The "IP address" management item stores an IP address assigned to a corresponding physical node.

The "VM ID" management item stores an identifier of a virtual machine (VM) operating over a corresponding physical node.

The "service used" management item stores an identifier of a service that is available on a corresponding physical node. Such a service may for example be, but is not limited to, a cloud service or an edge computing service. Furthermore, such a service may include a service that is made available across a plurality of physical nodes.

The "user" management item stores an identifier of a user who uses a service indicated by a corresponding "service used" management item. A user may, for example, be a corporation or an individual. When, for example, a corresponding physical node is an edge device, a user may be limited to an owner of the edge device.

The "cloud infrastructure ID" management item stores an identifier of a cloud infrastructure that a corresponding physical node belongs to.

The management items of the physical layer configuration information 21a shown in FIG. 3 are given as an example and more management items may be added thereto. For example, a memory size, CPU frequency, power supply status, and name of a virtual machine (VM) that operates on a corresponding physical node may be included as management items of the physical layer configuration information 21a.

For example, a name and an identifier of a resource pool used for a corresponding physical node may be included as management items of the physical layer configuration information 21a.

For example, a type, an identifier, and a name of a network in which a corresponding physical node is disposed may be included as management items of the physical layer configuration information 21a.

For example, an identifier, a type, and a name of a folder used by a corresponding physical node may be included as management items of the physical layer configuration information 21a.

For example, a storage capacity, an identifier, a type, and a name of a data store used by a corresponding physical node may be included as management items of the physical layer configuration information 21a.

For example, an identifier and name of a data center that controls a corresponding physical node may be included as management items of the physical layer configuration information 21a.

For example, a user name and password that are used as authentication information of a user who accesses a corresponding physical node may be included as management items of the physical layer configuration information 21a.

Referring back to FIG. 2, the virtual layer configuration information 21b is configuration information on a virtual node in the virtual layer. As shown in FIG. 4, the virtual layer configuration information 21b includes management items such as a "node ID", a "state", a "VM name", an "IP address", and a "physical device ID". Values of individual management items are stored for each virtual node.

The "node ID" management item stores an identifier of a corresponding virtual node.

The "state" management item stores an operation state of a corresponding virtual node ("OK" for normal operation, "NG" for malfunction).

The "VM name" management item stores a name of a corresponding virtual node.

The "IP address" management item stores an IP address assigned to a corresponding virtual node.

The "physical device ID" management item stores an identifier of a physical node over which a corresponding virtual node is disposed.

The management items of the virtual layer configuration information 21b shown in FIG. 4 are given as an example and other management items may be added thereto. For example, a VM ID that provides identifier information of a corresponding virtual node may be set as a management item of the virtual layer configuration information 21b.

For example, a memory size and a CPU frequency that are resources of a corresponding virtual node may be set as management items of the virtual layer configuration information 21b.

For example, a power supply status of a corresponding virtual node may be set as a management item of the virtual layer configuration information 21b.

For example, a user name and password that are used as authentication information of a user who accesses a corresponding virtual node may be set as management items of the virtual layer configuration information 21b.

For example, a gateway, VXLAN (Virtual Extensible Local Area Network), and static route that are used by a corresponding virtual node may be set as management items of the virtual layer configuration information 21b.

For example, a host name of a physical node over which a corresponding virtual node is disposed may be set as a management item of the virtual layer configuration information 21b.

For example, information on a hypervisor that creates a corresponding virtual node may be included as a management item of the virtual layer configuration information 21b.

A management item of a container application may be set as a management item of the virtual layer configuration information 21b. For example, a host name, a label, a state, and an account ID of a registered container host of a container that is used by a corresponding virtual node may be set as management items of the virtual layer configuration information 21b.

For example, an identifier, a name, a state, and a scale (the number of one or more servers used) of a service provided by a container used by a corresponding virtual node may be set as management items of the virtual layer configuration information 21b.

For example, a mounted volume, an identifier (only when RancherNFS [Network File System] is used), and an image identifier of a storage device provided by a container that is used by a corresponding virtual node may be set as management items of the virtual layer configuration information 21b.

For example, the following information on a stack of a storage device provided by a container used by a corresponding virtual node may be set as management items of the virtual layer configuration information 21b: a group, a state of health, a stack identifier, and an identifier of a service that is used.

Cloud Infrastructure Selection Part 12a

The cloud infrastructure selection part 12a that is included in the blueprint creation part 12 selects, from multiple cloud infrastructures that each realizes a cloud service, a cloud infrastructure that satisfies a condition included in a request for configuration change regarding a connection of a device that uses a cloud service to a physical node. The identifier of the selected cloud infrastructure forms a part of the physical layer configuration information 21a.The cloud infrastructure selection part 12a is a part of the function of the blueprint creation part 12 and may, for example, identify the selected cloud infrastructure by accessing an API for resource information collection and resolving the collected information.

Note that although this embodiment is described for a case where a cloud infrastructure for realizing a cloud service is selected, the disclosure is applicable to cases concerning a service other than a cloud service. In other words, the disclosure is also applicable to a case where, instead of a cloud infrastructure, a service infrastructure that realizes a service other than a cloud service is selected. The cloud infrastructure selection part 12a according to this embodiment is one specific example of a service infrastructure selection part that selects a service infrastructure.

Although described here as being included in the blueprint creation part 12 as an example, the cloud infrastructure selection part 12a may be disposed anywhere in the ICT resource management device 1.

Layer Mapping Part 14

Referring back to FIG. 2, the layer mapping part 14 performs a mapping between the physical layer and the virtual layer. More specifically, based on configuration information managed by the configuration information management part 13, the layer mapping part 14 determines with which physical node (or to which application 6 deployed on a corresponding physical node) of the physical layer a virtual node of a virtual layer is associated. The ICT resource management device 1 stores a determined result of the association between a physical node and a virtual node as mapping information 22. For example, the layer mapping part 14 may determine an association between a physical node and a virtual node by referencing the "VM ID" management item in the physical layer configuration information 21a (see FIG. 3) and the "physical device ID" management item in the virtual layer configuration information 21b (see FIG. 4).

A detailed description of the blueprint 24 with reference to FIG. 5 is provided as follows. FIG. 5 is a diagram for explaining a blueprint of initial deployment. As shown in FIG. 5, a blueprint 24 is configured as a service template paired with a parameter. The service template may be composed of a collection of catalogs. A catalog is a template of a process that is used in providing a service and is a component of the catalog group 23 stored in the ICT resource management device 1. The catalog itself is well known and a detailed explanation thereof is thus omitted. The parameter is input information for each catalog.

The blueprint 24 of FIG. 5 is that of initial deployment. Thus, the order information acquired by the request acquisition part 11 is order information on initial deployment. In the case of initial deployment, the blueprint creation part 12 may, for example, configure a service template by selecting a catalog for creating a virtual machine (VM), catalog for network (NVV) configuration, and catalog for container configuration from the catalog group 23.

Parameters that are inputted to the catalog for creating a virtual machine (VM) are, for example, a number and type of one or more virtual machines to be created. In FIG. 5, parameters specifying a total of five virtual machines (VMs), three of which function as web servers and two of which function as application (AP) servers, are inputted to the catalog for creating a virtual machine (VM). A parameter that is inputted to the catalog for creating a virtual machine (VM) may, for example, be inputted by a service provider terminal 2.

A parameter that is inputted to the catalog for network (NW) configuration is, for example, an allocated IP address. In FIG. 5, a parameter specifying an IP address of a created virtual machine is inputted to the catalog for network (NVV) configuration. A parameter that is inputted to the catalog for network (NW) configuration may, for example, be acquired from the distributed system 100.

A parameter that is inputted to the catalog for container configuration is, for example, a method for setting container configuration that is used by a created virtual machine. In FIG. 5, a parameter representing a setting method of copy execution by Rancher is inputted to the catalog for container configuration. A parameter that is inputted to the catalog for container configuration may, for example, be inputted by a service provider terminal 2.

The blueprint creation part 12 configures a service template by selecting a necessary catalog from the catalog group 23 according to an operation indicated by the order information acquired by the request acquisition part 11. The blueprint creation part 12 may acquire a parameter to input to a selected catalog from the order information or the distributed system 100. That is, the blueprint creation part 12 may acquire a parameter to input to a selected catalog by (a) requesting the parameter from a service provider terminal 2 or the like that has sent the order information, (b) receiving the order information again as a response to the request, and (c) and acquiring the parameter from this order information. The blueprint creation part 12 may acquire a parameter that is input to a selected catalog from the distributed system 100 when the distributed system 100 itself can acquire the parameter, such as through IP address allocation.

When a blueprint 24 is created, the blueprint creation part 12 references the configuration information that is managed by the configuration information management part 13 and the mapping information that is stored by the layer mapping part 14. That is, the blueprint creation part 12 creates a blueprint 24 by comparing a request of a service provider or the like that is indicated by the order information with the current states of a physical node and a virtual node that are determined from the physical layer configuration information 21a, virtual layer configuration information 21b, and mapping information 22.

Workflow Execution Part 15

The workflow execution part 15 executes a workflow in accordance with a blueprint 24 that has been created by the blueprint creation part 12. The workflow is a sequence of processes that are indicated by a catalog in the blueprint 24 and are combined in a systematic order. A workflow for initial deployment according to the blueprint 24 of initial deployment of FIG. 5 will be a sequence of processes combined in a systematic order such as the following: create a virtual machine (VM)−>set network (NVV) configuration−>set container configuration. Upon execution of the workflow by the workflow execution part 15, orchestration is performed and a resource is allocated to an ICT resource.

API Adapter Part 16

The API adapter part 16 is an interface for accessing a program that can be operated via an API in response to an instruction from the workflow execution part 15 that executes a workflow. This API is a southbound API between the API adapter part 16 (or the ICT resource management device 1 that includes an API adapter part 16) and a target of orchestration. The API adapter part 16 may establish an interface connection to each target of orchestration. An API adapter part 16 may be provided for each program that can be operated via an API. The workflow execution part 15 may perform a workflow by executing a program that can be operated via an API. A combination of the workflow execution part 15 and API adapter part 16 works as an orchestrator part that performs orchestration.

Monitor Part 17

The monitor part 17 monitors a physical node in the physical layer and a virtual node in the virtual layer with, for example, SNMP. A monitored result obtained by the monitor part 17 indicates a usage status of a service that has been made available through orchestration. The monitored result of the monitor part 17 may be sent to the configuration information management part 13. The configuration information management part 13 may collect information on a physical node and a virtual node from the monitored result of the monitor part 17.

Service Management Information 25

The service management information 25 is management information of a service (for example, a network service or a cloud service) that is available for use in the distributed system 100. As shown in FIG. 6, the service management information 25 includes management items such as "service ID", "cloud infrastructure ID", "type", "used application", "charge", "quality", "providing area", "connected service ID", and "operational ICT resource". A value of each of the management items is stored for every service. The above-mentioned multiple types of management items that are included in the service management information 25 correspond to the multiple types of conditions that are included in the request for configuration change regarding a connection of a device that uses a cloud service to a physical node. These conditions are conditions requested by a service provider.

In the "service ID" management item, an identifier of a corresponding service (a "target service") is stored.

In the "cloud infrastructure ID" management item, an identifier of a cloud infrastructure that realizes a target service is stored.

In the "type" management item, information indicating a type of a target service is stored. The stored information may for example be, but is not limited to, information indicating a computing service, storage service, big data service, or machine learning service.

In the "used application" management item, an identifier of one or more applications 6-1-6-3 that are used to provide a target service is stored. In other words, a used application is an application that make up the content of a target service.

In the "charge" management item, information indicating an amount of money that is charged when a device 5 uses a target service is stored. The stored information may for example be, but is not limited to, information indicating a charged amount according to the monthly amount of communication.

In the "quality" management item, information indicating a quality of a target service is stored. The stored information may for example be, but is not limited to, information representing a Service Level Agreement (SLA) that is set for the service.

In the "providing area" management item, information indicating an area in which a target service is provided is stored. In other words, information indicating an area where a target service is available for use by a device 5 is stored. The stored information may for example be, but is not limited to, information representing an area within an x kilometer radius (where "x" is a value) of an edge 4 or an area covering a whole city.

In the "connected service ID" management item, an identifier of a service that is connected to a target service is stored. There are some services for connecting multiple services. When a service provider wishes to provide a first service, instead of selecting a first cloud infrastructure that realizes the first service, a second cloud infrastructure that realizes a second service that is connected to the first service may be selected. Thus, by selecting the second cloud infrastructure, the service provider can provide the first service.

In the "operational ICT resource" management item, an identifier of an ICT resource that operates when a target service is provided is stored. In other words, an operational ICT resource is a physical node where a used application is deployed or a virtual node that operates over the physical node. The operational ICT resource is an ICT resource that becomes a target of allocation of a resource when a new request is received from a service provider. The operational ICT resource either belongs to a cloud infrastructure that realizes a target service or is physically connected to an ICT resource belonging to the cloud infrastructure. The physical connection may for example be achieved via a WAN (wide area network) and CPE (customer premises equipment).

When, upon a request of a service provider, a new device 5 is to be connected to a physical node that make up a cloud infrastructure, the cloud infrastructure selection part 12*a* selects an optimum cloud infrastructure if there exists a plurality of similar cloud infrastructures. The selection is made so that the selected cloud infrastructure is optimum for the order information that is a request from a service provider for configuration change regarding the connection of the device 5 to a physical node. By "similar cloud infrastructures", it is meant that a cloud service provided by each of the cloud infrastructures has the same "type" (see FIG. 6) but differs from each other in terms of the "charge", "quality", "providing area", connected service ID", "operated ICT resource" (see FIG. 6), or any combination thereof.

The order information includes, as a request of a service provider, a condition regarding a type of cloud service that is provided by the service provider. The cloud infrastructure selection part 12*a* references the service management information 25 and identifies, from the "type" (see FIG. 6), a cloud service that matches the type indicated by the request of the service provider and identifies a cloud infrastructure (in general, there are multiple) that realizes the identified cloud service from the "cloud infrastructure ID" (see FIG. 6).

Furthermore, the order information includes, as a request of the service provider, one or more conditions regarding, for example, a charge, quality, and providing area. A condition regarding the charge may for example be an upper limit on the monthly amount charged for using a cloud service. A condition regarding the quality may for example be maximum opening delay time, maximum network delay time, maximum network utilization rate, maximum line utilization rate, maximum failure recovery time, maximum failure notification time, a minimum guaranteed bandwidth, or any combination thereof that are set for a cloud service. A condition regarding a providing area may be a boundary of an area in which the device 5 can use a cloud service. The cloud infrastructure selection part 12a references the service management information 25 to identify a cloud infrastructure that satisfies the conditions regarding the charge, quality, and providing area from the one or more cloud infrastructures that have been identified from the type and cloud infrastructure ID (see FIG. 6). If there is only one identified cloud infrastructure, the cloud infrastructure selection part 12a selects that cloud infrastructure as the optimum cloud infrastructure. When there are more than one identified cloud infrastructures, a cloud infrastructure that is, for example, most advantageous for the service provider in terms of charge, quality, and providing area may be selected as the optimum cloud infrastructure.

When the selected cloud infrastructure is a cloud infrastructure that the device 5 can connect to according to the "connected service ID" and "operational ICT resource" (see FIG. 6) of the service management information 25, the cloud infrastructure selection part 12a keeps the result of the cloud infrastructure selection. When, on the other hand, the selected cloud infrastructure is a cloud infrastructure that the device 5 cannot connect to (due to a reason such as a lack of connection between cloud services or a lack of physical connection between ICT resources), the cloud infrastructure selection part 12a may, for example, select a cloud infrastructure that is second most advantageous to the service provider in terms of charge, quality, and providing area as the optimum cloud infrastructure. A selection of this kind is advantageous in that it can exclude a cloud infrastructure that is, from a virtual layer aspect, capable of deploying an application and satisfies the conditions of the service provider but is, from a physical layer aspect, not possible to physically connected to.

The blueprint creation part 12 creates a blueprint 24 based on the configuration information that is managed by the configuration information management part 13, a cloud infrastructure that is selected by the cloud infrastructure selection part 12a, and mapping information 22 that is saved by the layer mapping part 14.

The workflow execution part 15 executes a workflow in accordance with the blueprint 24 that is created by the blueprint creation part 12. As a result of the execution, orchestration is performed and a resource is allocated to an ICT resource.

Processing

Processing that is performed by the ICT resource management device 1 according to this embodiment is described with reference to FIG. 7. The processing begins when, for example, there is a request for an operation made in response to a request from a service provider. The operation that is requested may, for example, be a configuration change regarding a connection of a device 5 that uses a cloud service to a physical node.

In step S1, the request acquisition part 11 outputs order information indicating an operation such as a configuration change to the blueprint creation part 12. In step S2, the blueprint creation part 12 requests the configuration information management part 13 for configuration information. In step S3, the configuration information management part 13 outputs the configuration information that is stored in the configuration information database 21, more specifically the physical layer configuration information 21a and virtual layer configuration information 21b, to the blueprint creation part 12.

For the order information, the cloud infrastructure selection part 12a of the blueprint creation part 12 selects, by referencing the service management information 25 (see FIG. 6), a cloud infrastructure that satisfies a condition included in the order information (step S3a). The selection result is then outputted (step S3a).

In step S4, the blueprint creation part 12 requests the layer mapping part 14 for mapping information 22. In step S5, the layer mapping part 14 outputs the mapping information 22 to the blueprint creation part 12.

In step S6, the blueprint creation part 12 creates a blueprint 24 for the order information based on the configuration information, the selected cloud infrastructure, and the mapping information. At this stage, and in accordance with the order information, the blueprint creation part 12 selects a catalog required for the operation from the catalog group 23 and acquires a parameter to be inputted to a selected catalog from the order information or distributed system 100.

In step S7, the blueprint creation part 12 transmits, via the request acquisition part 11, the created blueprint 24 to the service provider terminal 2 or the like that transmitted the order information and requests confirmation of the blueprint 24. When the blueprint 24 is confirmed without a problem, the request acquisition part 11 transmits information indicating an approval from the service provider terminal 2 or the like to the blueprint creation part 12 (step S8).

Of the entire processing that is performed by the ICT resource management device 1, steps S1 to S8 constitute an infrastructure design process.

Note that steps S7 and S8 may be omitted to expedite the processing.

In step S9, the blueprint creation part 12 creates a script for performing an orchestration based on the approved blueprint 24. Techniques for creating a script is well known and detailed explanation thereof is thus omitted. In step S10, the blueprint creation part 12 outputs the created script to the workflow execution part 15.

Of the entire processing that is performed by the ICT resource management device 1, steps S9 and S10 constitute a script creation process.

In step S11, the workflow execution part 15 interprets the script acquired from the blueprint creation part 12. A technique for interpreting a script is well known and detailed explanation thereof is thus omitted. In step S12, the workflow execution part 15 sends an instruction to the API adapter part 16 for each of one or more programs that can be operated via an API, to thereby execute an appropriate process.

When the execution of the process is complete, the API adapter part 16 notifies the workflow execution part 15 of the completion of the process execution (step S13). The workflow execution part 15 then notifies the blueprint creation part 12 of the completion of the process execution (step S14). The completion of the process execution means that an orchestration of the virtual layer by the ICT resource management device 1 is complete, and the service post configuration change is available.

Of the entire processing that is performed by the ICT resource management device 1, steps S11 to S14 constitute an orchestration process.

The monitor part 17 then begins monitoring a physical node of the physical layer and a virtual node of the virtual layer. The monitor part 17 notifies the configuration information management part 13 of information collected through monitoring (step S15). The configuration information management part 13 then notifies the layer mapping part 14 of the information collected from the monitor part 17 (step S16).

Of the entire processing that is performed by the ICT resource management device 1, steps S15 and S16 constitute a monitoring process.

The configuration information management part 13 creates configuration information from the information collected by the monitor part 17 and stores the configuration information in the configuration information database 21. Also, through the configuration information management part 13, the layer mapping part 14 creates mapping information 22 from the information collected by the monitor part 17. The configuration information and the mapping information 22 that are created are used for creating a new blueprint.

Figure 7:
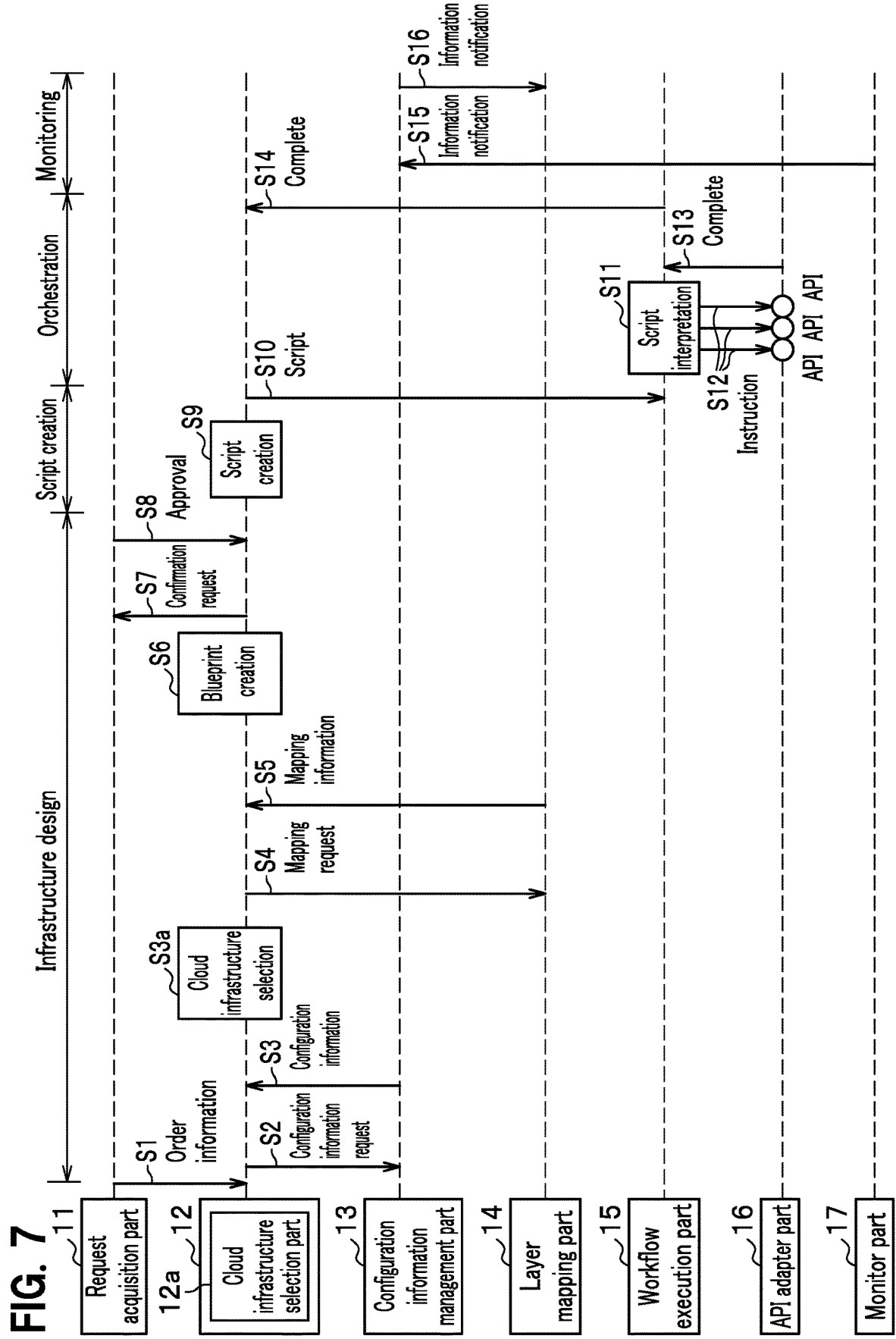
FIG. 7 is a sequence diagram showing an example of processing performed according to an embodiment.

With the processing of FIG. 7, the ICT resource management device 1 can maintain the configuration information and mapping information 22 up to date. This makes it possible to create a blueprint without human intervention and to perform orchestration, allowing the operation to be automated.

Also, selection of an optimum cloud infrastructure in response to a request for an operation such as a configuration change can be automated.

According to this embodiment, it is possible to (a) select an optimum cloud infrastructure that meets the request of a service provider without involving human work and (b) perform orchestration to allocate a resource to an ICT resource of the selected cloud infrastructure.

Thus, efficiency of work involved in making a cloud service available by a service provider is improved, thereby reducing operating cost.

A concrete means of selecting a cloud infrastructure is achieved through the referencing of the service management information 25.

Program

A program may be created in which the processing performed by the ICT resource management device 1 according to the abovementioned embodiment is described in a computer-executable language. In this case, when the computer executes the program, advantageous effects that are the same as those of the abovementioned embodiment can be achieved. Additionally, the program may be stored in a non-transitory, computer-readable medium. A computer loads and executes the program stored in the storage medium to perform a processing that is the same as that of the abovementioned embodiment. An example of a computer that executes an ICT resource management program that achieves a function that is the same as that of the ICT resource management device 1 is described below.

Figure 8:
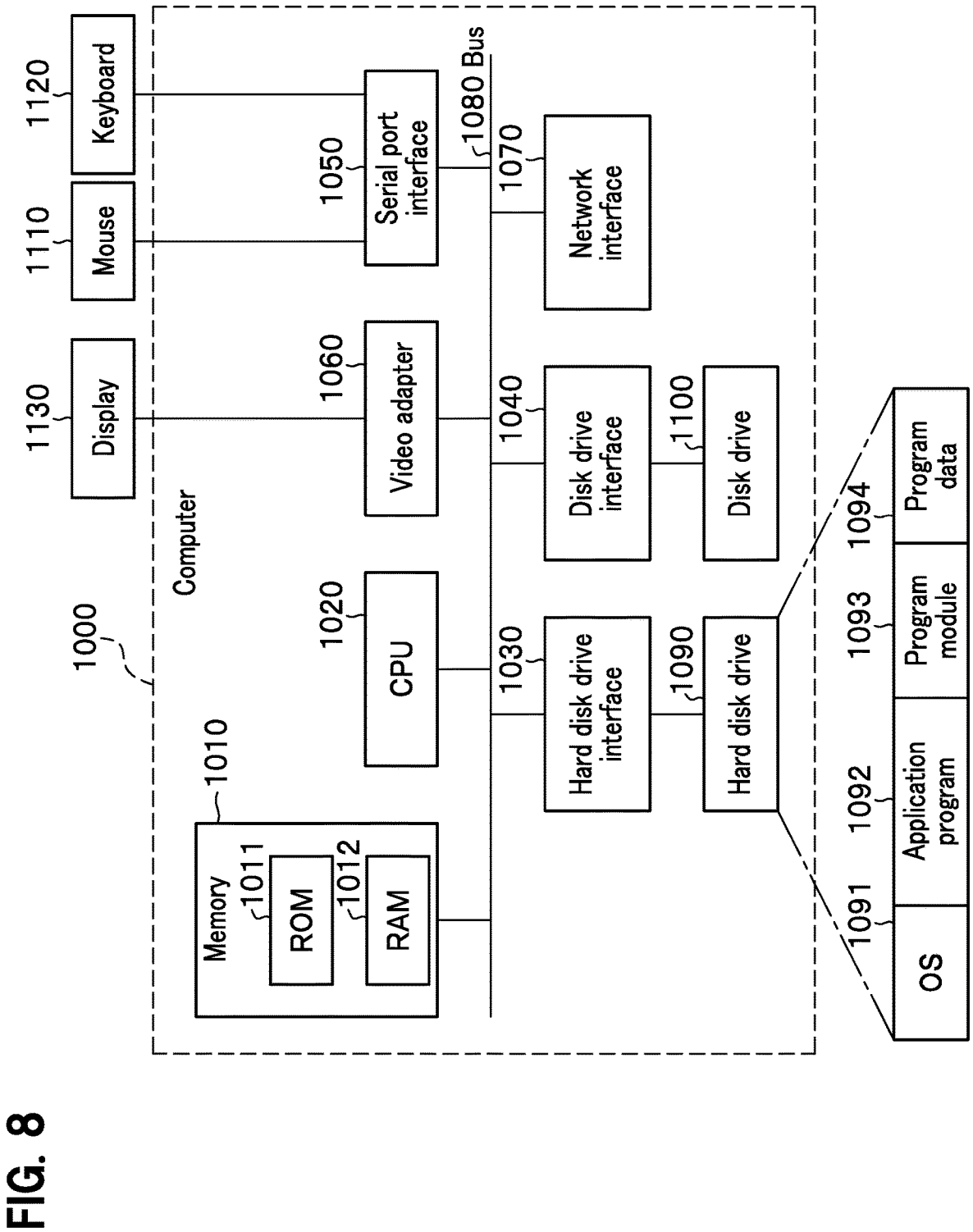
FIG. 8 is a diagram showing a computer that executes a program for the processing according to an embodiment.

FIG. 8 is a diagram of a computer that executes an ICT resource management program. As shown in FIG. 8, a computer 1000 includes, for example, a memory 1010, a CPU 1020, a hard disk drive interface 1030, a disk drive interface 1040, a serial port interface 1050, a video adapter 1060, and a network interface 1070, which are connected to each other by a bus 1080.

The memory 1010 includes a ROM (a read-only memory) 1011 and a RAM (a random-access memory) 1012. The ROM 1011 stores therein a boot program such as BIOS (Basic Input/Output System). The hard disk drive interface 1030 is connected to a hard disk drive 1090. The disk drive interface 1040 is connected to a disk drive 1100. The disk drive 1100 has a removable, non-transitory storage medium inserted therein, for example, a magnetic disk or an optical disc. The serial port interface 1050 is connected to, for example, a mouse 1110 and a keyboard 1120. The video adapter 1060 is connected to, for example, a display 1130. The memory 1010, hard disk drive 1090, disk drive 1100, and non-transitory storage medium inserted into the disk drive 1100 are hardware resources that make up the storage that the ICT resource management device 1 is equipped with.

As shown in FIG. 8, the hard disk drive 1090 stores therein, for example, an OS 1091, an application program 1092, a program module 1093, and program data 1094. The tables explained in the description of the embodiment are stored, for example, in the hard disk drive 1090 or the memory 1010.

The ICT resource management program is stored in the hard disk drive 1090 as, for example, a program module in which an instruction executed by the computer 1000 is described. More specifically, program modules of individual processes performed by the ICT resource management device 1 as explained in the description of the embodiment are stored in the hard disk drive 1090.

Data used in information processing of the ICT resource management program is stored as program data in, for example, the hard disk drive 1090. The CPU 1020 reads a program module 1093 or program data 1094 from the hard disk drive 1090 and into the RAM 1012 as deemed necessary to execute the above-described steps.

The program module 1093 or program data 1094 of the ICT resource management program may be stored in the hard disk drive 1090 but is not limited thereto. To give one example, the program module 1093 or the program data 1094 may be stored in a removable, non-transitory storage medium and may be read out by the CPU 1020 via the disk drive 1100 or the like. To give another example, the program module 1093 or the program data 1094 may be stored in another computer connected via a network such as a LAN (Local Area Network) or a WAN (Wide Area Network) and may be read out by the CPU 1020 via the network interface 1070.

Others (a) The configuration information management part 13 may manage information on a location of a physical node.

(b) The configuration information management part 13 may manage information on a user of a device 5 that is connected to an edge 4 perceived as a physical node, or information on a tenant of a user. Thus, the configuration information managed as the physical layer configuration information 21a may be configuration information that is per-user based or per-tenant based. When the layer mapping part 14 performs a mapping between the physical layer and the virtual layer, the configuration information that is per-user based or per-tenant based may be used as configuration information that is managed as the virtual layer configuration information 21b.

(c) There may be an ICT resource management device 1 that is in accordance with the embodiment for every cloud infrastructure. In this case, the ICT resource management devices of corresponding cloud infrastructures may communicate with one another to select an optimum cloud infrastructure.

Advantageous Effects

According to each of the first and third aspects of the disclosure, (a) an optimum service infrastructure that meets a requirement of a service provider is selected without involving human work and (b) orchestration is performed to allocate a resource to an ICT resource in the selected service infrastructure.

Thus, efficiency of work involved in enabling a service provider to provide a service is improved, thereby reducing an operation cost.

According to a second aspect of the disclosure, the ICT resource management device is in accordance with the first aspect, and the service infrastructure selection part is further configured to select the service infrastructure that meets the condition by referencing service management information that manages a service using a plurality of types of management items, the plurality of types of management items including a type of management item corresponding to the condition.

According to the second aspect of the disclosure, a means of selecting a service infrastructure is provided through the referencing of service management information.

According to a fourth aspect of the disclosure, an ICT resource management program causes a computer to serve as an ICT resource management device according to the first or the second aspect.

According to the fourth aspect of the disclosure, the ICT resource management device can be easily configured.

According to the disclosure, an operation cost is reduced by improving efficiency of work involved in enabling a service provider to provide a service.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

REFERENCE SIGNS LIST

100 Distributed system
1 ICT resource management device
2 Service provider terminal
3 Server
4 Edge
5 Device
6 Application
7 Virtual machine (VM)
11 Request acquisition part
12 Blueprint creation part
12a Cloud infrastructure selection part (an example of a service infrastructure selection part)
13 Configuration information management part
14 Layer mapping part
15 Workflow execution part (orchestrator part)
16 API adapter part (orchestrator part)
17 Monitor part
21 Configuration information database
21a Physical layer configuration information
21b Virtual layer configuration information
22 Mapping information
23 Catalog group
24 Blueprint
25 Service management information

The invention claimed is:

1. An information and communication technology (ICT) resource management device for managing a physical node and a virtual node as ICT resources, the ICT resource management device comprising:

a configuration information management part, including one or more processors, configured to manage physical layer configuration information and virtual layer configuration information, wherein the physical layer configuration information is information on a configuration of the physical node in a physical layer and the virtual layer configuration information is information on a configuration of the virtual node in a virtual layer;

a service infrastructure selection part, including one or more processors, configured to select, in response to a request for a configuration change concerning a connection of a device that uses a service to the physical node, a service infrastructure that meets a condition included in the request from a plurality of service infrastructures that realize the service;

a layer mapping part, including one or more processors, configured to perform a mapping between the physical layer and the virtual layer;

a blueprint creation part, including one or more processors, configured to create, in response to the request for a configuration change, a blueprint based on the physical layer configuration information, the virtual layer configuration information, the selected service infrastructure, and mapping information that results from the mapping, wherein the blueprint is design information of an infrastructure that is required for the configuration change; and an orchestrator part, including one or more processors, configured to perform, based on the blueprint, orchestration of the virtual layer by accessing and executing a program that is capable of being operated through an API.

2. The ICT resource management device according to claim 1, wherein the service infrastructure selection part is further configured to select the service infrastructure that meets the condition by referencing service management information that manages a service using a plurality of types of management items, the plurality of types of management items including a type of management item corresponding to the condition.

3. An information and communication technology (ICT) resource management method of an ICT resource management device that manages a physical node and a virtual node as ICT resources, the ICT resource management method, implemented by the ICT resource management device, comprising:

collecting physical layer configuration information and virtual layer configuration information, wherein the physical layer configuration information is information on a configuration of the physical node in a physical layer and the virtual layer configuration information is information on a configuration of the virtual node in a virtual layer;

selecting, in response to a request for a configuration change concerning a connection of a device that uses a service to the physical node, a service infrastructure that meets a condition included in the request from a plurality of service infrastructures that realize the service;

performing a mapping between the physical layer and the virtual layer;

creating, in response to the request for a configuration change, a blueprint based on the physical layer configuration information, the virtual layer configuration information, the selected service infrastructure, and mapping information that results from the mapping, wherein the blueprint is design information of an infrastructure that is required for the configuration change; and performing, based on the blueprint, orchestration of the virtual layer by accessing and executing a program that is capable of being operated through an API.

4. The ICT resource management method according to claim 3, further comprising:

selecting the service infrastructure that meets the condition by referencing service management information that manages a service using a plurality of types of management items, the plurality of types of management items including a type of management item corresponding to the condition.

5. A non-transitory computer-readable storage medium having instructions stored thereon that, when executed by one or more processors, cause the one or more processors to perform operations of an information and communication technology (ICT) resource management device that manages a physical node and a virtual node as ICT resources, the operations comprising:

collecting physical layer configuration information and virtual layer configuration information, wherein the physical layer configuration information is information on a configuration of the physical node in a physical layer and the virtual layer configuration information is information on a configuration of the virtual node in a virtual layer;

selecting, in response to a request for a configuration change concerning a connection of a device that uses a service to the physical node, a service infrastructure that meets a condition included in the request from a plurality of service infrastructures that realize the service;

performing a mapping between the physical layer and the virtual layer;

creating, in response to the request for a configuration change, a blueprint based on the physical layer configuration information, the virtual layer configuration information, the selected service infrastructure, and mapping information that results from the mapping, wherein the blueprint is design information of an infrastructure that is required for the configuration change; and performing, based on the blueprint, orchestration of the virtual layer by accessing and executing a program that is capable of being operated through an API.

6. The non-transitory computer-readable storage medium according to claim 5, wherein the operations further comprising:

selecting the service infrastructure that meets the condition by referencing service management information that manages a service using a plurality of types of management items, the plurality of types of management items including a type of management item corresponding to the condition.

* * * * *